Patented July 7, 1942

2,288,872

UNITED STATES PATENT OFFICE 2,288,872

OLEFIN POLYMERIZATION

John A. Anderson and Edmond L. d'Ouville, Chicago, Ill., assignor to Standard Oil Company, Chicago, Ill., a corporation of Indiana No Drawing. Application December 30, 1939, Serial No. 311,946

12 Claims. (Cl. 196—10)

This invention relates to the catalytic conversion of hydrocarbons. More particularly, it relates to the catalytic polymerization of normally gaseous hydrocarbons to normally liquid hydrocarbons. Still more particularly, it relates to the use of an improved catalyst for the polymerization of normally gaseous hydrocarbons.

It is well known to polymerize normally gaseous hydrocarbons to normally liquid hydrocarbons of the motor fuel boiling range at elevated temperatures and pressures, with or without catalysts. The thermal process requires rather high temperatures and pressures and does not produce particularly good yields of products. The catalytic processes, while not requiring such high temperatures and pressures, do not give especially good yields of products either over-all or per pass. In addition, many of the catalysts used in such processes are rather expensive.

It is, therefore, an object of the present invention to provide an improved process for catalytically polymerizing normally gaseous hydrocarbons to normally liquid hydrocarbons especially those of the motor fuel boiling range. A further object is to provide such a process involving the use of a cheaper and more efficient polymerization catalyst. Still another object is to provide a normally gaseous hydrocarbon polymerization process in which the catalyst used has a higher resistance to elevated temperatures occurring during regeneration. A more specific object is to provide an improved process for catalytically polymerizing mixtures comprising $C_3$ and $C_4$ olefins to normally liquid hydrocarbons of the motor fuel boiling range in which a cheaper, more efficient and more rugged polymerization catalyst is employed. Other objects will appear hereinafter.

It has now been found that these objects may be accomplished by polymerizing normally gaseous hydrocarbons in the presence of a catalyst derived by the gelation of water insoluble metal silicates with an acid which acid treatment may be preceded by a heat treatment or fusion with basic oxides if necessary. The gelation of the silicate ordinarily involves powdering it, then disintegrating with acid and finishing by conventional washing and drying steps. Preferably water insoluble silicates are used which are disintegrable with acid without preliminary heat treatment or fusion with basic oxides. However, the invention includes within its scope the use of catalysts prepared from certain silicate materials which require initial processing, such as fusion or fluxing with a metallic oxide such as lime in order to render the silicate amenable to attack and solution by acid.

As disclosed in a co-pending application of the inventors named herein, Serial No. 311,947, filed December 30, 1939, in which their preparation is described, the catalysts are prepared from certain silicates or mixtures of silicates, natural or artificial, which contain in their composition catalytically activating metals which include such metals as magnesium, aluminum, beryllium, uranium and manganese. These metals are, it will be noted, closely related as to electrode potentials, appearing together in the electromotive force series of elements. It is not understood and the invention is not intended to be limited to this theory but it is believed that the similarity as to catalytic activity between these elements is related to their electrode potentials.

The catalytically activating metals are usually present in the form of their silicates in the starting material which may be composed principally of calcium or magnesium silicates or compounds thereof. Catalytically activating metals, however, may be added at a later stage in the preparation of the catalysts from silicates. Of the catalytically activating metals mentioned, aluminum is preferred because of its ready availability and its satisfactory catalytic activity.

It is important that the silicate material from which the catalysts are to be prepared contain sufficient basic materials to render the silicate disintegrable by acid. Such basic materials include calcium oxide, iron oxide, magnesium oxide, manganese oxide, barium oxide, and in particular the alkaline earth compounds. In general these compounds of metals whose oxides dissolve in or react readily with ordinary acids, such as hydrochloric or sulfuric acids, even after fusion are suitable basic materials. The use or presence of the alkali metals is avoided as it has been found that they are objectionable in the finished catalyst and their removal is often troublesome. However, small amounts of alkali metals may be present, e. g., 2 to 10% in the raw materials, but they must be washed out of the catalyst later in the preparation. Potassium and sodium are the alkali metals usually encountered.

In order to obtain satisfactory disintegration of the silicate from which the catalyst is prepared, it is preferable to use silicates containing about 20 to 50% $SiO_2$, although in the case of certain silicates, a larger amount of $SiO_2$ may be present. Thus, in the case of magnesium silicate or talc, the amount of $SiO_2$ permissible may be about 64%, yet satisfactory disintegration may be obtained after the talc has been fused. In the case of zirconium silicate or zircon, however, the amount of $SiO_2$ present is only 33%, yet the mineral is not disintegrated by acid until it has been fused with calcium oxide or other base. Those silicates containing a high percentage of the alkali earth metals will, in general, disintegrate in acid if the $SiO_2$ content does not exceed 55%. However, those silicates which contain a high percentage of silicon dioxide, such as pumice, beryl, kaolinite, orthoclase, microcline, plagioclases higher than 47% $SiO_2$, coal ash and volcanic ash require fusion with basic oxide to make the same disintegrable with acid.

Another example of the effect of the silica composition on the disintegrability of the silicate in acid is illustrated by a feldspar, a potassium-aluminum silicate containing about 65% of $SiO_2$, the ratio of base metal to $SiO_2$ being 4 chemical equivalents of base metal to 3 $SiO_2$. This feldspar is not disintegrated by acid but when 3 parts of the feldspar are fused with 1 part of calcium oxide, the resulting silicate, containing about 49 to 52% of $SiO_2$, may be disintegrated with hydrochloric acid. It has been found that in general those silicates which contain 2 or more chemical equivalents of readily soluble base metal oxide for each $SiO_2$, may be disintegrated. Where the metal combined with the silicate is amphoteric, such as aluminum or zirconium, a higher proportion of base is necessary. Where the amount of $SiO_2$ in the silicate is too high, as in the case of the feldspar, just cited, the silicate may be fused with additional base such as calcium or magnesium oxides or carbonates, or with a basic silicate or slag. Thus a silicate of low silica content and a silicate of high silica content may be fused together to obtain a material which is satisfactorily disintegrable by acid. Fusion usually requires a temperature upwards of 1000° C., in some cases as high as 1500 to 2000° C. Silicates containing less than 20% $SiO_2$ in the composition, for example, 10% $SiO_2$, may be readily dissolved by the acid, but, in general, the yield of catalyst resulting from these silicates is too low to make their use economic.

An important characteristic of the silicate materials which are employed is that they are water-insoluble, thus distinguishing them from the alkali metal silicates such as sodium silicate. The basic constituents preferred are the alkaline earth metals, especially calcium and magnesium. The following are typical examples of natural silicates which may be employed. The formulas are, of course, approximate and often do not indicate the presence of activating elements as aluminum, magnesium, manganese, beryllium, uranium, etc.

| Formula | Mineral |
|---|---|
| $(LiKNa)_2((AlFe)OHF)_2(SiO_3)_3$ | lepidolite (mica) |
| $NaAlSiO_4$ | nephelite |
| $CaAl_2(SiO_4)_2$ | anorthite |
| $MgFeSiO_4$ | olivine |
| $Zn_2SiO_4$ | willemite |
| $H_4Mg_3Si_2O_9$ | serpentine |
| $CaSiO_3$ | wollastonite |
| $Ca_3Al_2(SiO_4)_3$ | hessonite |
| $Mn_3Al_2(SiO_4)_3$ | spessartite |
| $Ca_3Fe_2(SiO_4)_3$ | melanite |
| $Ca_2Al_3(OH)(SiO_4)_3$ | epidote |
| $H_2Mg_3(SiO_3)_4$ | talc |
| $CaTiSiO_5$ | sphene |

Some of the above minerals may be disintegrated directly by treatment with acid while others must be first fused or sintered. Of the latter class are lepidolite, hessonite, spessartite, melanite, epidote and talc.

In addition to the above silicates, certain commercial products and by-products of fusion operation which meet the requirements of the silicates set out above, may be employed. Among these are glasses, slags, blast furnace slag from steel smelting operations, metallurgical slags from lead, zinc and copper, ferrosilicon smelting, etc., basic and acid open hearth furnace slags, Bessemer process and Aston process slags, mineral wool, slag wool, Portland cement, etc. Blast furnace and open hearth slags usually have about the following analysis:

| Blast furnace | Basic open hearth | Acid open hearth |
|---|---|---|
| Silica 25–40% | Silica 10–15% | $SiO_2$ 40–52% |
| Alumina 10–15% | Iron oxide 10–18% | FeO 20–35% |
| Magnesia 5–25% | CaO,MgO 45–55% | MnO 12–20% |
| Lime 20–50% | $P_2O_5$ 5–15% | |

Traces of iron, manganese, potash, soda, sulfur and phosphorus are also present. The calcium content is usually between 5 and 40%. In the case of the blast furnace slag the silica and alumina contents may vary from the figures stated and silica may reach 55% in some cases. Alumina may be as low as 5% or less and yet the slag will yield a satisfactory catalyst upon treatment. It is preferable to employ silicate materials which are of uniform, homogeneous composition in order that the acid may act uniformly on all parts of the material. Uniformly fused silicates are, therefore, advantageous. When fusing silicates, desired activating metal oxides or silicates etc. may be added to the fusion. Thus zircon may be added to a silicate fusion to supply zirconium, bauxite to supply aluminum, or beryl to supply beryllium. Monazite may also be added to supply the rare earth elements, including thorium, when desired.

In carrying out the preparation of the polymerization catalysts from water-insoluble silicates, it is desirable to grind or otherwise reduce the silicate or mixture of silicates to a fine powder in order that it may be more readily attacked by the acid used in the disintegration step of the process. Thus the silicate material may be reduced to about 50 or 100 mesh and in some cases even to 150 or 300 mesh. If no large particles are present, complete solution in acid will take place in a short time. If large particles are present they may not be completely disintegrated or dissolved and will remain in the finished catalyst product or, if desired, they may be separated in a separate step as hereinafter described. The powder is then treated with a solution of a strong acid, such as hydrochloric, sulfuric, sulfamic, oxalic, phosphoric or nitric acid. For example, the powdered silicate can be slurried with water and added gradually to the acid solution or the powdered silicate may be slurried with a larger amount of water and the acid added. The powdered silicate may also be added dry to the acid solution.

In a typical example, the silicate may be treated with hydrochloric acid at a concentration of 15 to 20% HCl adding about 1 part of silicate to about 5 parts by weight of the acid solution. The treatment may be conducted at ordinary temperature, which usually requires cooling to remove the heat of reaction. In general, however, it has been found desirable to carry out the treatment at somewhat elevated temperature, for example, 80 to 150° C., but preferably at the boiling point of the acid, which in the case of 17% HCl, is about 110° C. Thus, whereas the treatment may require several hours or days at ordinary temperature, disintegration of the silicate may be complete within 5 minutes to an hour at the elevated temperature attained by allowing the reaction to proceed normally without cooling.

By controlling the concentration and the quantity of the acid use, the strength of the catalyst may be improved. In a typical example 100 grams of powdered blast furnace slag silicate previously moistened were disintegrated with a solution of 250 ml. 35% hydrochloric acid dissolved in 1700 ml. of water. The yield of catalyst after coagulation, washing and drying was 40 grams. If much less acid is used, the silicate will not be completely disintegrated. Also, if much less water is used the catalyst obtained will have a lower density and will be generally physically weaker. The use of more water increases the cost of evaporation and drying and the concentration may be increased, for example, to 100 grams of silicate for each 800 ml. of water, but in that case, it is desirable to allow the gelled catalyst to age for several hours to several days before washing in order to increase the physical strength of the resulting catalyst. When sulfuric acid is used, it has been found that 100 grams of concentrated sulfuric acid diluted to approximately 2 liters is sufficient to disintegrate 100 grams of powdered silicate. This ratio of acid to silicate will need to be varied somewhat, due to differences in the compositions of different silicates and in general the amount of acid necessary must be increased in proportion to the base content of the silicate. When phosphoric acid is used in the proportion of about 200 grams or more of acid to 100 grams of silicate, precipitation of calcium phosphate may be largely avoided.

Where the silicate material is sufficiently finely ground, it will pass completely into solution in the acid giving a colloidal silica sol together with salts of other elements present, such as calcium, magnesium, aluminum, iron, manganese, etc. Thus, in the treatment of blast furnace slag with hydrochloric acid, calcium and aluminum chlorides are present with the silica sol. In the case where, because of insufficient grinding or non-uniformity, some of the silicate remains undissolved in the acid, it may be separated from the solution by filtration or decantation. Dirt and inert matter, such as carbon, sand, etc., may be also removed in this way. To facilitate this separation, if desired, the solution may be stabilized in various ways, as by strong cooling, adding alcohol or other stabilizers. In either case, the solution is allowed to coagulate in the form of a gel. Coagulation may be accelerated by evaporating the solution to remove water, by heating, boiling, or by adding coagulants, such as phosphoric acid or neutralizing agents, such as ammonium hydroxide, calcium hydroxide, sodium acetate, sodium silicate, etc. to adjust the hydrogen ion concentration. By carefully controlling the hydrogen ion concentration during gelation, a stronger catalyst is obtained.

In another embodiment of the invention, an increased or complete retention of the activating metal is brought about by adding a neutralizing agent after disintegration is complete. Where a neutralizing agent is used, it is generally desirable to add an amount only sufficient to reduce the acidity without completely neutralizing the acid. Thus, the acidity of the disintegrated silicate solution may be reduced to a pH of about 1 to 5. When sodium silicate is employed as a neutralizing agent, silica is produced and combines with the catalytic substance from the silicate mineral. In some cases, it is desirable to carry the neutralization beyond a pH of 5 and thereby precipitate a portion of the basic elements present. Thus, sufficient ammonia may be added to bring about the precipitation of some aluminum hydroxide and thus increase the amount of alumina in the coagulated catalyst. After coagulation, the gelatinous mass is broken up and washed with a copious quantity of water to remove excess acid and/or soluble salts, or the washing step may be deferred until after initially drying or partially drying. In some cases it may be desirable to leave some metallic salt in the catalyst and then calcine to drive out the salt, if volatile, or to convert the salt to metallic oxide.

After washing, the gel is dried and crushed to the desired size or pelleted, for use in the hydrocarbon polymerization process. The catalyst may also be powdered and contacted with the gaseous hydrocarbons in suspension. After using the catalyst for polymerization of hydrocarbons, it becomes deactivated chiefly as the result of carbon deposition and it may then be reactivated by burning with air or a mixture of air and inert gas, care being taken to prevent excessive temperatures during regeneration which have been found to permanently impair catalyst activity. Generally, the regeneration temperature should be kept below about 1100° F., although in some cases temperatures as high as 1400° F. may be tolerated without serious damage to the catalyst. It has been found that the disintegrated silicate catalysts are unusually hardy in this respect.

The amount of acid used will depend upon the kind and amount of basic material present in the silicate. In general, the amount of acid used should be in excess of that required to convert the basic oxides to salts. The amount of excess should be such that the reaction mixture is distinctly acid even after the complete disintegration of the silicate. This excess is desirable both to enhance the rate of disintegration and to improve the physical properties of the catalyst. It is preferable to use a stoichiometric excess of acid of 2% to 50%. In cases where subsequent neutralization with sodium silicate is intended, the amount of excess acid will depend upon the desired ratio of activating metal to silica in the catalyst and may be several hundred percent. On the other hand, where neutralization with lime or ammonia is anticipated, it is preferable to use a minimum excess of acid.

As indicated hereinabove, various acids may be used for decomposing the silicate. When sulfuric acid or phosphoric acid is employed, for example, 10 to 25% concentration of sulfuric acid, a major portion of the calcium contained in the silicate is converted into the insoluble sulfate or phosphate. It is found by actual tests that the presence of calcium sulfate in the catalyst may confer certain valuable properties. Thus, it has been found that in some cases the calcium sulfate increases the physical strength of the catalyst and also may increase the catalyst life by inhibiting the deposition of carbon. The amount of calcium sulfate in the catalyst may be controlled by regulating the amount of $H_2SO_4$ used in disintegration of the silicate, completing the disintegration with HCl or other acid.

If it is desired, however, to eliminate the greater part of the calcium sulfate from the catalyst, this may be readily accomplished by filtering or decanting the disintegrated solution obtained from the disintegration of the silicate before gelation has occurred. The time required for gelation depends on a variety of conditions and will ordinarily be between one hour and one day. Gelation, however, may be inhibited or slowed down in several ways, for example, by adding alcohol or by cooling the solution, thereby facilitating the separation of calcium sulfate and/or other insoluble substances.

Because of its complex nature, analysis of the catalysts prepared as described above is not easy. One analysis gave the following results:

|  | Per cent |
| --- | --- |
| $SiO_2$ | 85.24 |
| $Al_2O_3$ | 2.05 |
| $CaO$ | 1.71 |
| $Mg$ | Trace |
| $P$ | Trace |
| $H_2O$ | 10.9 |

This analysis shows over 10% water of hydration which was driven off on heating to 750° F.

In general, the amount of activating metal in the catalyst, chiefly aluminum in this case, is small in comparison to the silica content and may be within the range of about 0.05 to 10%. Usually, the amount of activating metal present is about 0.5 to 2%, although in the case where neutralization methods are used during preparation of the catalyst, the amount of activating metal, for example, alumina, will be somewhat higher, for example, 5% to 8%. If the gelled silicate is washed with hot water, the amount of alumina or other activating element left in the catalyst may be increased, probably because of increased hydrolysis of the aluminum salts present.

The silica content is correspondingly high, usually about 80% or 90% and sometimes as high as 95% to 98%, except in the case where calcium sulfate, barium sulfate or other insoluble salt is present, in which case, the silica content may be as low as 50% or less, as previously indicated. Other catalytically activating elements may be added to the catalyst in addition to any present therein by adding their salts or oxides to the silicate either before or after disintegration. Thus, aluminum, beryllium, manganese, magnesium, uranium or boron oxide may be added to the silicate in amounts of 0.05 to 3%, more or less. If oxides, hydroxides, or other insoluble compound of the activating element are employed, they should be thoroughly mixed with the gelled silicate or the finished silicate catalyst by grinding.

The catalyst material may also be modified by applying to it other catalytic materials after the catalyst has been coagulated and washed, either before or after drying. Thus, solutions of certain compounds of activating elements, such as beryllium chloride, beryllium nitrate, manganese sulfate, potassium permanganate, uranium chloride, uranyl nitrate, aluminum sulfate, ammonium borate, boric acid, magnesium chloride, etc. may be applied to the coagulated and washed catalyst. The resulting product is then dried and heated to an elevated temperature to decompose the activating compounds. The catalyst may also be intimately mixed with oxides, hydroxides, etc. of the activating elements, such as aluminum, beryllium, magnesium, uranium, manganese, boron, etc.

The catalysts derived from silicate minerals by treatment with acid, as set forth above, are excellent catalysts for the polymerization of normally gaseous hydrocarbons to normally liquid hydrocarbons. They are particularly effective for the polymerization of the $C_3$—$C_4$ olefins but may be used to effect the polymerization of any normally gaseous unsaturated hydrocarbons alone or in a mixture which is, itself, normally gaseous. Such polymerization may be effected at temperatures ranging from about 250° F. up to about 750° F.; preferably the temperature employed will be in the range from about 350° F. to about 650° F. Pressures may range from 15 lb./sq. in. up to 1500 lb./sq. in. or even higher if desired. The preferred range of pressures is from about 200 lbs./sq. in. to about 1500 lb./sq. in. Under these conditions the feed rate should be from about 0.05 to about 10 vol. of liquid feed per hour per gross volume of catalyst and preferably from about .1 to about 5 vol. of liquid feed per hour per volume of catalyst. It will be noted that the conditions specified embrace not only those where the hydrocarbons are in either liquid or vapor phase or partially in one or in the other, but also conditions where the hydrocarbons are in the so-called dense phase lying above the extrapolated vapor pressure curve of the stock. Preferably the polymerization reactions are carried out under these last named conditions, that is, in the dense phase. It is also preferred that combinations of conditions be selected from among those above specified so that maximum yields of hydrocarbons boiling within the gasoline boiling range are produced.

In order that the invention may be better understood, the following example is included. It is intended that this example shall be construed as illustrative only and not as limiting the scope of the invention.

*Example 1.*—Catalyst was prepared from blast furnace slag by digesting about 100 g. of the pulverized slag in 1 l. of 19% hydrochloric acid for several hours. The digestion mixture was boiled to dissolve any soluble material. Upon dilution with water a white gelatinous material separated from the heavy granular gangue. The gelatinous material was separated by decantation and was washed until free of iron (as shown by the potassium thiocyanate test) and washing continued until there was no free acid in the filtrate. This gelatinous material was then dried at 140° C. overnight after which it was broken up and the fines pelleted and added to the finely broken catalyst. There was obtained by this method approximately 20% of solid material based on the weight of the original sample. This catalyst was placed in a catalyst chamber and substantially pure propylene after passing through a wash tower containing moist soda lime was passed into contact with the catalyst in the chamber at a rate of about .42 g. of feed/hour/cc. of catalyst at a pressure of about 200 lb./sq. in. and at a temperature of about 525 to 700° F. (the temperature was difficult to control because of the heat evolved). During a five and one-half hour run under these conditions 0.85 g. of polymer per g. of catalyst were produced and the catalyst at the end of the run showed no tendency towards reduction in activity. A yield of 66% by weight of polymer based on the propylene charge was obtained, of which polymer about 91.5% boiled within the gasoline boiling range. When fractionated, about 33% came over at 160° F., 48% at 212° F., 91% at 342° F., and 91.5% at 400° F. The CFR-M octane number of this 400° F. end point product was 82.2.

As may be observed from these data, the catalysts derived from silicate minerals and employed in the improved polymerization process described herein, are not only cheap but, in addition, possess exceptionally good polymerization activity under moderate conditions and an important advantage is the fact that the polymer products obtained consist, to a large extent, of hydrocarbons boiling within the gasoline boiling range. Other advantages of the invention appear from the above description.

It is apparent that many widely different embodiments of this invention may be made without departing from the spirit and scope thereof and, therefore, it is not intended to be limited except as indicated in the appended claims.

We claim:

1. The process which comprises polymerizing normally gaseous olefinic hydrocarbons to normally liquid hydrocarbons in the presence of a catalyst obtained by at least partially disintegrating by the action of an acid a water insoluble silicate containing sufficient basic constituents to render it disintegrable in said acid, said basic constituents comprising a catalytically activating element, whereby said silicate is substantially completely dissolved and is converted to a clear sol, coagulating the clear sol and washing and drying the resulting gel catalyst containing the catalytically activating element.

2. The process of claim 1 further characterized in that the catalytically activating element is a metal.

3. The process which comprises polymerizing normally gaseous olefinic hydrocarbons to normally liquid hydrocarbons in the presence of a catalyst obtained by disintegrating with an acid a normally water insoluble silicate containing about 20% to 50% $SiO_2$, and sufficient basic constituents to render the silicate disintegrable in said acid, said basic constituents comprising a catalytically activating metal, whereby said silicate is substantially completely dissolved and is converted to a clear sol, and coagulating and drying the dissolved disintegration product of said silicate.

4. The process which comprises polymerizing normally gaseous olefinic hydrocarbons to normally liquid hydrocarbons in the presence of a catalyst obtained by dissolving in a strong acid a water insoluble alkaline earth metal silicate containing not more than 64% $SiO_2$, sufficient alkaline earth metal to render it soluble in said acid and a lesser amount of a catalytically activating metal, adjusting the water content of said solution to provide a coagulant of satisfactory physical strength, allowing said solution to coagulate and evaporating the water from the desired solid catalyst product.

5. The process of claim 4 further characterized in that at least 10% of the catalytically activating metal is present in the water insoluble silicate.

6. The process of claim 4 further characterized in that the catalytically activating metal is present in the water insoluble silicate in the proportion of about 1% to 20%.

7. The process which comprises polymerizing normally gaseous olefinic hydrocarbons to normally liquid hydrocarbons in the presence of a catalyst obtained by subjecting to the action of a strong acid a finely divided water insoluble silicate containing not more than 55% $SiO_2$ and from about 1% to about 20% of a catalytically activating element, whereby said silicate is substantially completely dissolved in an excess of said acid and said silica is converted to a sol, allowing said sol to coagulate to a gelatinous solid material and washing and drying the resulting gel containing active silica and said catalytically activating element.

8. The process of claim 7 further characterized in that the excess acid is neutralized with a solution of sodium silicate.

9. The process of claim 7 further characterized in that the polymerization is carried out at a temperature of between about 250° F. and about 750° F.

10. The process which comprises polymerizing normally gaseous olefinic hydrocarbons to normally liquid hydrocarbons in the presence of a catalyst obtained by fusing together at an elevated temperature a water insoluble, acid insoluble silicate containing more than 50% $SiO_2$ and a catalytically activating element, and sufficient basic material to render said silicate acid soluble after fusion, cooling the fused silicate, reducing it to a powder, dissolving the powder in a strong acid, separating a gel containing the catalytically activating element from the resulting solution and drying the gel.

11. The process of claim 10 further characterized in that the polymerization is carried out at a temperature of between about 250° F. and about 750° F.

12. The process of claim 10 further characterized in that the polymerization is carried out at a temperature of about 250° F. to about 750° F., a pressure of about atmospheric to about 1500 lb./sq. in. and at a flow rate of about 0.05 to 10 vol. of liquid feed per hour per volume of catalyst.

JOHN A. ANDERSON.
EDMOND L. D'OUVILLE.